June 23, 1959     R. L. GUENTNER ET AL     2,892,089
RADIOGRAPHIC APPARATUS
Filed May 28, 1957     3 Sheets-Sheet 1

WITNESSES

INVENTORS
Robert L. Guentner &
Harry E. Koerner
BY
ATTORNEY

June 23, 1959  R. L. GUENTNER ET AL  2,892,089
RADIOGRAPHIC APPARATUS
Filed May 28, 1957  3 Sheets-Sheet 2

June 23, 1959  R. L. GUENTNER ET AL  2,892,089
RADIOGRAPHIC APPARATUS

Filed May 28, 1957

United States Patent Office 2,892,089
Patented June 23, 1959

2,892,089
RADIOGRAPHIC APPARATUS

Robert L. Guentner, Baltimore, and Harry E. Koerner, Catonsville, Md., assignors to Westinghouse Electric Corporation, East Pittsburgh, Pa., a corporation of Pennsylvania Application May 28, 1957, Serial No. 662,055

5 Claims. (Cl. 250—66)

The present invention relates to X-ray spot film radiographic devices and has more particular reference to apparatus for successive positioning of photographic plates to obtain a series of X-ray photographs reasonably contemporaneous with a visual fluoroscopic examination.

In fluoroscopic diagnosis of human disorders, it is desirable to photograph the fluoroscopically observed features of the anatomy as quickly as possible after the visual observations. Abnormalities such as stomach ulcers and the like are fleetingly and uncertainly observable, thereby requiring a photographic apparatus capable of rapid and accurately recording for future reference and detailed study of the conditions observed. Several apparatus having the foregoing capabilities are known to those skilled in the art and are generally referred to as spot film devices.

The known devices usually are comprised of the following elements or equivalent elements having substantially the same functions:

A flat substantially rectangular frame or housing having a pair of spaced openings in the top surface thereof and having a carriage reciprocably shiftable within the housing for transporting a film holder or cassette between an idle position at one end of the housing and an active position adjacent the second opening in the housing. The second opening in the housing is adapted to contain a fluorescent screen and a lead glass superimposed on the fluorescent screen to allow visual observation of the screen while excluding X-rays from the face and eyes of the diagnostician. The rectangular frame of the spot film device is ordinarily mounted above a conventional X-ray table, on which table a patient may lie. The long dimension of the spot film frame is ordinarily positioned at right angles to the long dimension of the X-ray table with the first opening in the frame being toward the rear of the table and with the second opening in the frame being disposed above the table surface in alignment with an X-ray beam projected upwardly through the patient from an X-ray tube disposed within the table.

In order to obtain a series of photographs in rapid succession, it is the practice to provide an arrangement for rapidly shifting a film cassette horizontally in the spot film frame to successively different positions relative to the X-ray beam, thereby making it possible to obtain a series of pictures on a single sheet of film.

The cassette carrying means comprises a carriage which is ordinarily mounted on rollers and travels on a pair of tracks or the like within the spot film device to carry the cassette from the cassette loading or idle position to the various cassette active or photographing positions. The extent of movement of the carriage during successive cyclical movements is varied by means of adjustable stop elements disposed within the housing. Thus, the devices heretofore developed have provided for stopping the longitudinal carriage in at least two active positions longitudinally of the frame.

In order to expose the four quadrants of a rectangular film successively, the cassette carrying means must be first shifted to align a first quadrant of the cassette with an X-ray beam. The carriage must then be shiftable to the idle position during further visual observation and must be immediately ready, when in said idle position, to be shifted to a second active position to align a second quadrant of a film in the exact location previously occupied by the first quadrant. After exposure of the second quadrant to provide a second picture on the film, the cassette carriage is again shifted through the same cycle except that the cassette is laterally shifted to permit the laterally adjacent third and fourth quadrants to be successively positioned in alignment with the X-ray beam.

The type of apparatus thus far described is known to those skilled in the art and may be conveniently grouped into two general classes, namely, those which are manually operated and those which are power operated as by means of an electric motor or an equivalent motor device.

In the manually operated spot film devices, it has been the practice for the operator to reach into the first opening at the rear of the spot film device to manually push the film cassette from a first lateral position to a second transversely shifted position. The necessity of manually shifting the cassette carrier laterally of the longitudinal carriage after exposing the first two quadrants of the film is an undesirable distraction of the diagnostician from the fluorescent image being observed. Further, it is an undesirable delay in the sequence of successive exposures and it requires that the diagnostician interrupt the manual palpation of the patient's anatomy. Such interruption of palpation during the course of an examination often results in obscuring the particular anatomical feature which was to be photographed. Resumption of palpation does not assure the same view of the same anatomical feature and a second opportunity to photograph a particular ulcer or the like may not occur.

The improved spot film device of this invention may utilize any one of a number of known arrangements for longitudinal shifting of the longitudinally movable carriage means. The carriage means travels from an idle or loading position within the first opening to successively different active or photographing positions underneath the fluorescent screen. In addition, this invention provides a novel arrangement including a transversely or laterally shiftable carrier supported on the carriage means.

The novel arrangement of this invention further includes means for quickly and effortlessly shifting the cassette carrier transversely of the carriage means without requiring the diagnostician to reach into the first opening and without requiring significant delay between the second and third exposures of a single film.

Thus the present invention provides means for individually and successively positioning each of the four quadrants of a rectangular film in alignment with the X-ray beam and such positioning is rapidly accomplished by a simple and efficient driving mechanism which requires little or no attention on the part of the diagnostician during the sequential positioning and exposure of the four film quadrants.

Accordingly, a principal object of this invention is to provide a spot film device utilizing automatic transverse shifting of the cassette carrier without delay or distraction of the diagnostician.

It is another object of this invention to provide an improved transverse shift actuation means wherein the mechanism is rapid in operation and is less complex and hence less subject to faulty operation.

It is a further object to provide transverse shift actuation means wherein free running movement of the cassette carrier to the second transverse position is obtained by the use of energy stored in the mechanism prior to the beginning of an examination.

It is an additional object of this invention to provide a selectively controllable cassette carrier shifting mechanism wherein the shifting mechanism is easier to operate and is provided with simplified control means.

It is a different object to provide a transverse shifting mechanism which includes yielding means for urging the cassette carrier toward the second lateral position and which further includes selectively operable position control means including latching mechanism for normally retaining the cassette carrier in a first lateral position with potential energy for shifting the cassette carrier being stored in the yielding means.

These and other objects of our invention will be apparent from the following description, taken in accordance with the accompanying drawing, throughout which like reference characters indicate like parts, which drawing forms a part of this application and in which.

Figure 1:
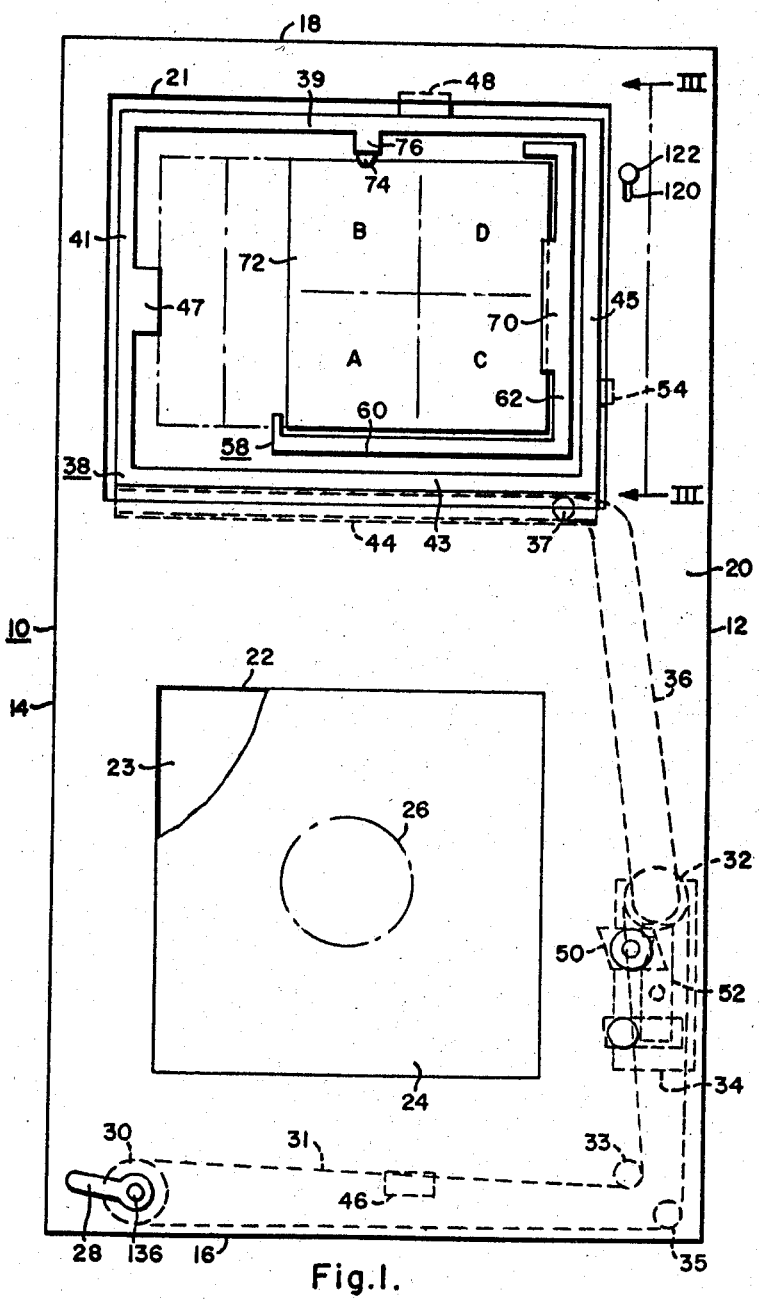
Figure 1 is a plan view of a spot film device in accordance with the present invention.

In Fig. 1, there is shown a spot film device comprising generally a shallow rectangular casing or frame 10 including right and left side walls 12 and 14, a lateral front wall 16, a lateral rear wall 18 and a top cover panel 20 having portions cut away to provide a pair of substantially rectangular openings. The first opening 21 is located toward the rear of the spot film device and is substantially larger than the film cassette to be used so that unexposed film cassettes may be readily inserted into the apparatus through the first opening 21 and so that the diagnostician or the assisting technician may conveniently remove exposed cassettes therethrough. The second rectangular opening 22 is disposed toward the front of the spot film device. This second opening 22 is covered by means of a conventional fluorescent screen 23 and a lead glass 24 disposed thereon and secured to the top panel 20.

The under surface of the spot film device frame is covered in a conventional manner by a plate of rigid material such as steel (not shown), a second plate of radiation opaque material, such as lead, and an outer radiation transparent panel of material such as aluminum or Micarta. The lead and steel plates have portions thereof cut away to provide a rectangular opening in registration with the fluorescent screen 23 so as to permit a beam of radiation from the X-ray tube to be projected vertically to the fluorescent screen 23. The lead plate is necessary in other areas of the spot film device to shield a cassette in the idle position from stray radiation and to shield the diagnostician from radiation which otherwise might be projected upwardly past the sides of the lead-glass cover 24.

It is to be understood that the X-ray tube (not shown) is positioned in the X-ray table in vertical alignment below the fluorescent screen 23, and is provided with an adjustable shutter mechanism of a conventional type so that the dimensions of the X-ray beam may be adjusted from time to time at the will of the operator. For example, during fluoroscopic examination, the diagnostician may desire that the beam create an image over substantially the entire area of the fluorescent screen 23. Likewise, the dimensions of the beam may be adjusted to provide a single picture covering substantially the entire area of a single cassette; or the beam may be adjusted to cover an area approximately the size of one quadrant of a single cassette. This usual technique of utilizing a small area beam is illustrated by means of the circle 26 shown in center of the fluorescent screen 23 of Fig. 1. The operation of the cassette shifting mechanism in conjunction with this small area beam to provide a plurality of separate pictures on a single sheet of film will be discussed hereinafter.

Adjacent the front left-hand corner of the spot film device in Fig. 1, there is shown a rotatable operating handle 28 which is journalled in the top cover 20 of the spot film device and has a driving sprocket 30 affixed to the lower end thereof. Adjacent the right side panel 12 of the spot film device is a second sprocket 32 supported beneath the top cover 20, and journalled on a mounting plate 34. The support shaft for the second sprocket 32 also carries an elongated crank arm 36 affixed thereto for rotation with the second sprocket 32. The longitudinally movable cassette carriage means comprising a carriage frame 38 of rectangular form is mounted within the spot film device and is provided with rollers or wheels attached to the side members thereof to roll against the top panel 20, the bottom panel, and the side panels 12 and 14 of the spot film device. The subcarriage 38 is adapted for movement longitudinally of the spot film device from registration with the first opening 21 to a plurality of longitudinally spaced positions in registration with the fluorescent screen 23.

Figure 2:
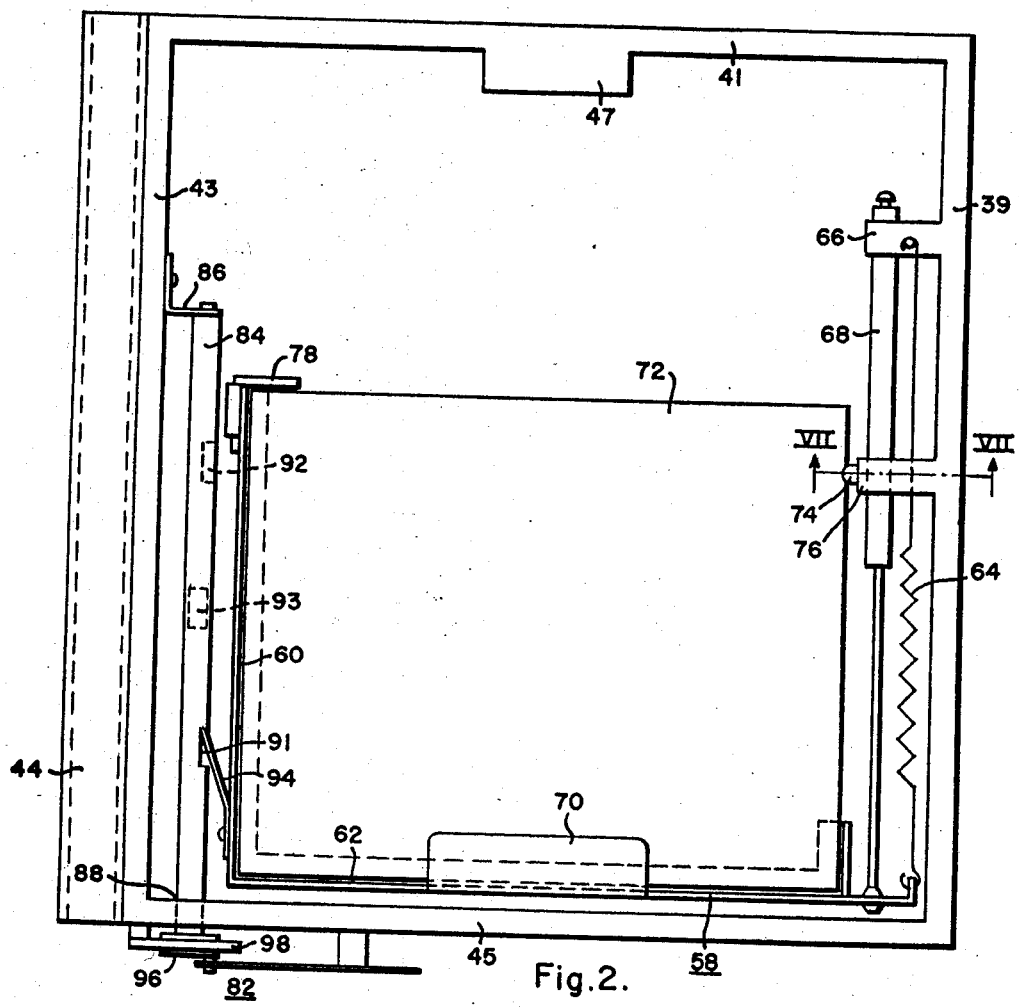
Fig. 2 is a plan view of the longitudinally shiftable subcarriage utilized in the apparatus of Fig. 1.

As shown in Figs. 1 and 2, a transversely extending channel member 44 is attached to the front cross member 43 of the subcarriage frame 38. A roller 37 mounted on the end of the crank arm 36 is disposed within the channel member 44 so as to move the carriage 38 forward when the crank arm is rotated. A conventional interconnecting chain 31 extends from the control handle sprocket 30 around a pair of idler sprockets 33 and 35 to the second sprocket 32. Thus it is seen that by rotation of the control handle 28, the crank arm 36 may be rotated to move the subcarriage 38 forward and backward in the spot film device between the first or idle position and the different active positions.

Near the front of the spot film device is a fixed stop 46 for limiting forward travel of the subcarriage 38. Near the rear cross member 18 of the spot film device is a rear stop block 48 affixed to limit rearward travel of the subcarriage 38. The rear stop 48 is accurately positioned so that the subcarriage 38, when resting against the stop 48, is accurately registered with the first opening 21 in the top panel. Adjacent the second sprocket 32 is a longitudinal position selector mechanism including a selector cam 50 in the form of a parallelogram mounted for rotation about a vertical axis and journalled on the mounting plate 34. The parallelogram selector cam 50 is provided with a ratchet mechanism 52 and cooperates with a stop block 54 attached to the right side of the subcarriage 38 so that each longitudinal extension of the subcarriage toward the front of the spot film device rotates the selector cam 50 through 90°.

When the selector cam 50 is disposed in the first position, the subcarriage 38 is allowed to pass the selector cam 50 and come to rest against the fixed stop 46. On the second excursion of the subcarriage 38 from the idle position toward the fluorescent screen 23, the selector cam 50 will have been rotated 90° to the position as shown in Fig. 1 so that the stop block 54 comes to rest against the selector cam 50, thereby arresting the subcarriage 38 in a partially extended second active position.

As shown in Fig. 2, the subcarriage 38 has supported thereon a transversely shiftable cassette carrier comprising a structurally rigid relatively flat L-shaped frame 58 formed of a transversely extending angle member 60 and a longitudinally extending angle member 62. A yielding means, which may be a coil spring 64, is connected between one corner of the transversely movable carrier 58 and a projection 66 on the rear cross member 39 of the subcarriage 38. Also connected between the projection 66 and the transversely movable carrier 58 is an air dashpot 68. A retaining flange 70 is affixed to the carrier 58 for retaining a cassette 72 therein. A spring-biased plunger pin 74 is mounted in a second projection 76 on the rear cross member 39 of the subcarriage and is operative to press against the rear edge of a cassette 72 to aid in retaining the cassette in the carrier 58. To this same end, a depressable casette retainer member 78 is affixed to the left end of the member 60. Midway of the left side member 41 of the subcarriage is a fixed stop member 47 for limiting the transverse movement of a cassette 72 when the cassette carrier 58 is transversely shifted from the first position as shown in Fig. 2 toward a second transversely shifted position.

In order to control transverse shifting of the carrier 58 under the influence of the tensioned coil spring 64, a transverse position selector mechanism 82 is provided. This mechanism includes an abutment member 84 in the form of a cylindrical shaft extending adjacent the front wall 43 of the longitudinal carriage 38. The abutment shaft 84 is journalled at its ends in appropriate bushings 86 and 88 affixed to the longitudinal carriage. The abutment shaft 84 includes intermediately of its ends three spaced stop shoulders 91, 92 and 93 formed by cutting away portions of the shaft 84. The three stop shoulders 91, 92 and 93 are spaced longitudinally along the cylindrical shaft and are also spaced at 45° intervals around the periphery of the shaft. A stop member in the form of a flat leaf spring 94 is affixed to the front member 60 of the carrier 58 with the end of the leaf spring 94 extending outwardly therefrom so as to cooperatively engage the stop shoulders 91, 92 and 93 on the abutment shaft.

Figure 3:
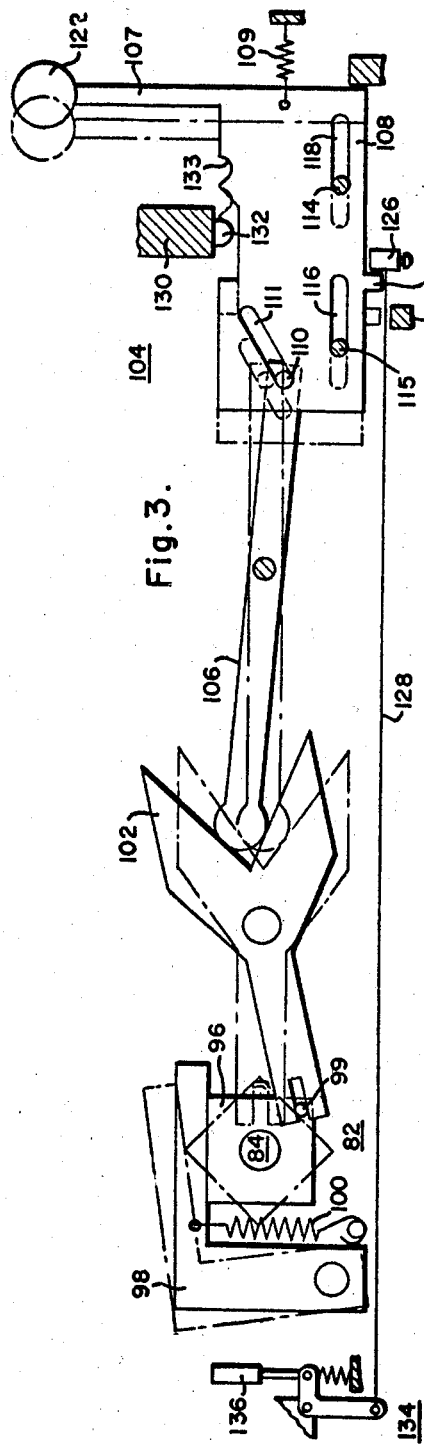
Fig. 3 is a sectional view taken substantially along the lines III—III of Fig. 1 to illustrate the control mechanism and latch mechanism of the transversely shiftable carrier.
Figure 4:
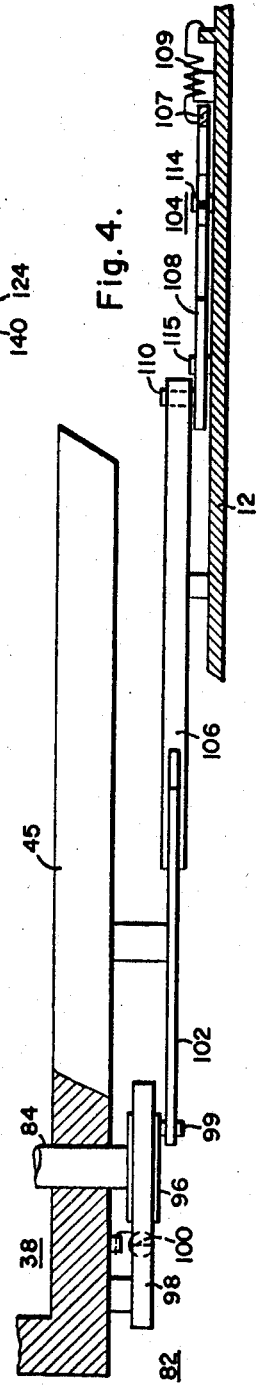
Fig. 4 is a plan view of the latch mechanism and control mechanism as shown in Fig. 3.

Attached to the end of the abutment shaft 84 is a detent mechanism including a square cam 96 and a cam follower 98 for selectively rotating the abutment shaft 84 to selectively dispose the shoulders 91, 92 or 93 for cooperation with the stop member 94. The detent mechanism is best shown in Figs. 3 and 4 and includes the square cam 96 affixed to the end of the abutment shaft 84 for rotation therewith, a pin 99 affixed to the square cam 96 and extending outwardly therefrom, and the L-shaped cam follower 98 which is pivotally connected to the subcarriage side member 45 and is spring-biased by means of a spring member 100 to normally maintain the square cam 96 in a first position as shown by the solid lines in Fig. 3. An abutment shaft actuator arm 102 is pivotably connected near its center to the subcarriage side wall 45. The actuator arm 102 is bifurcated at its left end to provide a slot which engages the eccentric pin 99. The right end of the actuator arm 102 is provided with a substantially V-shaped bifurcation which engages a control mechanism to be hereinafter described.

On the inside of the right-hand side wall 12 of the spot film device is mounted a transverse position control means 104 including a lever member 106, a slider member 108 and a biasing spring 109 which connects between frame member 12 and the slider member 108. As shown in Fig. 3, the left end of the lever member 106 is disposed so as to engage the actuator arm 102 of the latch mechanism 82 when the subcarriage 38 is in the idle position. When the subcarriage 38 moves from the idle position towards the active positions, the actuator member 102 is carried with the subcarriage. Thus, it is seen that the lever member 106 operatively engages the actuator member 102 only when the subcarriage 38 is in the idle or loading position. The lever member 106 is affixed to the frame 12 near its center so as to be pivotable in a vertical plane. The right end of the lever member 106 carries a short pin 110 which projects perpendicular therefrom and engages an elongated slanted opening 111 in the slider 108. The slider member 108 is affixed to the inside of the frame 12 by means of a pair of rivets 114 and 115 which are rigidly affixed in the frame 12 and which projects through a pair of elongated horizontal openings 116 and 118 in the slider member 108. Thus, it is seen that the slider member 108 is mounted on the inner wall of the frame 12 and is movable through a limited distance relative thereto. The spring member 109 is attached to the slider member by any convenient means and is operative to rearwardly bias the slider member 108. The slider member 108 includes a vertically extending portion 107 which extends upwardly through an elongated slot 120 in the top panel 20 of the spot film device and is provided with a knob 122 at the upper end thereof for convenience in manual actuation.

On the bottom surface of the slider member 108, as viewed in Fig. 3, is a projection 124 disposed to be engaged by a connector member 126 which is attached to the end of a pull wire 128. A detent device 130 including a spring loaded plunger 132 mounted on the under side of the top panel 20 and a notch 133 in the top surface of the slider member 108 is operative in conjunction with the function of the shift knob 122, which function will be hereinafter described. It is to be understood that the shift knob 122 and its operatively associated detent mechanism 130 are used only in conjunction with auxiliary positioning of the slider member 108. In the ordinary operation of the apparatus for successive exposure of four quadrants of a film, the knob 122 is not used but the slider member 108 is actuated solely by means of the cable 128. The pull wire or cable 128 is connected at its left to an operator's push button mechanism 134 and extends from the push button mechanism to the slider member 108 inside the right-hand portion of the spot film device. The spring biasing member 109 is operative to bias the slider member 108 toward the rear of the frame 12 and is sufficiently strong to retract the slider member 108 and the cable 128 after the slider member 108 has been pulled forward by pressing down on the operator's control push button 136. A stop member 140 is provided adjacent the lower edge of the slider member 108 and is operative to engage the connector member 126 so as to limit the forward travel of the connector member 126 and the slider member 108. The stop members associated with the slider member 108 may, of course, be made adjustable if so desired.

In Fig. 3 the unlatching mechanism 104 is shown with the slider 108 in the unactuated or rearmost position so that the slanted opening 111 in the slider member operates to push the right end of the lever member 106 down to thereby elevate the right end of the actuator arm 102. The left end of the actuator arm 102 is accordingly shown in the depressed or normal position with the square cam 96 being positioned with its top surface substantially horizontal. It is to be understood that the rotational position of the square cam 96 is controlled by the actuator arm 102 but that the square cam 96 is also actuated by means of the spring biased cam follower 98.

As was explained above, the transverse position latch mechanism 82 including the square cam 96, the cam follower 98 and the actuator arm 102 are adjustably affixed to the subcarriage 38 and travel therewith when subcarriage 38 is shifted from the idle position to its active positions under the fluoroscopic screen 23. In contrast, the unlatching mechanism 104 including lever member 106, slider member 108, and cable 128 are affixed to the frame 12 for limited movement only relative thereto. Thus, it is clear that lever member 106 engages the actuator arm 102 only when the subcarriage 38 is in the idle position and that push button 136 is not operative to actuate the latching mechanism 82 after the subcarriage 38 has left the idle position.

Figure 5:
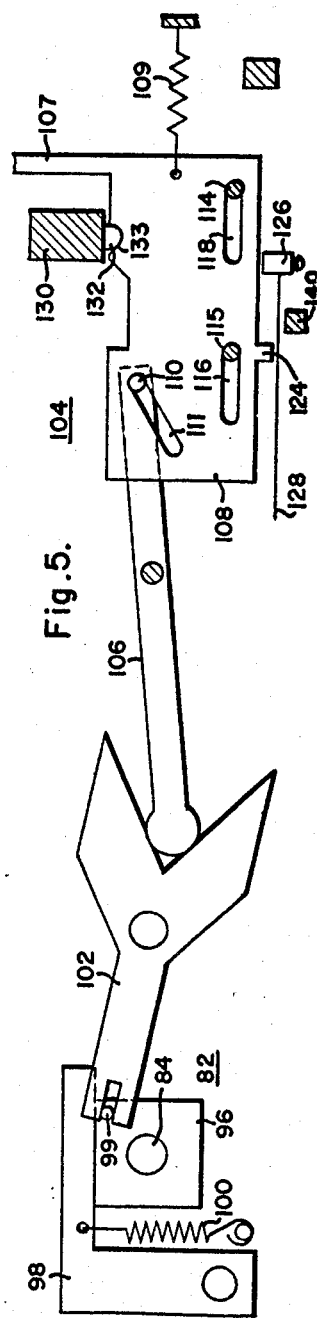
Fig. 5 is a view similar to Fig. 3, but depicting the control and latch mechanisms as oriented for center of the film exposure positioning.

The operation of the transverse position control means as shown in Figs. 3, 4 and 5 is substantially as follows. In order to successively expose the four quadrants of a single film, the operator manually rotates control handle 28 in the counterclockwise direction. Rotation of the second sprocket 32 will rotate the crank arm 36 about its pivot, and subcarriage 38 will move forwardly from the idle position to come to rest against the parallelogram cam 50. The transverse position control mechanism 104 will be in the position shown in the solid lines of Fig. 3 and the abutment shaft 84 will be rotatively oriented so that stop member 94 is engaged with the first shoulder 91. Thus, the cassette carrier 58 will be disposed in its first lateral position relative to the subcarriage 38 and quadrant A of the cassette will be disposed in alignment with the X-ray beam for exposure.

Figure 6A:
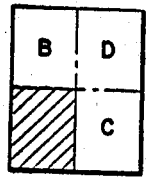
Fig. 6 is a plurality of diagrams illustrating successive positioning of different portions of a film in the sequential operation of the apparatus.
Figure 6B:
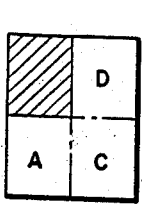

After the X-ray tube is energized and the first exposure is completed, the operator turns the control handle 28 counterclockwise, thereby returning subcarriage 38 to the idle position at which time the operator may continue visual examination with the fluorescent screen 23. When it is desired to record a second image, the operator again rotates the control handle 28 counterclockwise to again move the subcarriage 38 forward. The parallelogram cam member 50 is now disposed to allow the subcarriage 38 to pass, and the subcarriage moves all the way forward and comes to rest against the front stop member 46. When the subcarriage 38 is thus shifted to its furthermost extended position, quadrant B of the film is aligned with the circle 26 defined by the X-ray beam and the film is exposed as shown in Fig. 6B. After energizing the X-ray tube to expose quadrant B the operator may again return the subcarriage 38 to the idle or parked position.

Figure 6C:
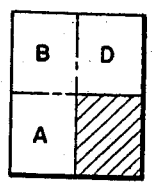
Figure 6D:
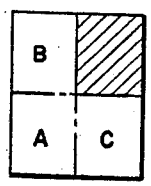

Prior to a third excursion of the longitudinal subcarriage the operator depresses the latch control push button 136 which is mounted axially in the control handle 28, thereby tensioning cable 128 and shifting the slider member 108 forward to the position shown by the dotted lines in Fig. 3. This action pivots lever member 106 and the actuator arm 102 to rotate the abutment shaft 84 45° counterclockwise as shown in Fig. 3. Rotation of the abutment shaft 84 disengages stop member 94 from the first shoulder 91 of the abutment shaft, and cassette carrier 58 is allowed to travel toward the left as shown in Fig. 1 under the influence of the coil spring 64. The cassette 72 is thus shifted transversely and is stopped by stop member 94 engaging the third shoulder 92 of abutment shaft 84. After having depressed the control push button 136 as just described the operator may immediately rotate the control handle 28 counterclockwise to shift the subcarriage 38 forward. The subcarriage 38 comes to rest against the parallelogram cam member 50, and the cassette 72 is thus positioned as shown in Fig. 6C for exposure of quadrant C. Immediately after exposure of quadrant C the operator may return the subcarriage 38 to the idle position in the same manner as previously described and may thereafter at any convenient time again move the subcarriage forward to its forwardmost position for exposure of quadrant D. After exposure of quadrant D the diagnostician or the assisting technician may remove the exposed cassette 72 containing a series of four separate photographic images from the carrier by reaching into the first opening 21. The carrier 58 is at this time shifted to the left as seen in Fig. 1. In order to load the apparatus for another four-on-one series, the technician uses an unexposed cassette to push the carrier 58 transversely so as to extend the coil spring 64 and automatically latch the carrier 58 in its first position with stop member 94 engaging first shoulder 91 of the abutment shaft 84. The weight of the cassette and its inertia as it is pushed into the first opening 21 under retaining lip 70 aid in stretching the coil spring 64 so as to cock the transverse positioning mechanism 82 for a second series of four pictures. It is to be understood that the transversely shifted position of the cassette carrier 58 brings the cassette 72 into engagement with stop member 47 attached to side member 41 of the subcarriage. Thus, it is seen that the transversely shifted position of the carrier 58 does not depend on stop member 94 being held by the third shoulder 92 of the abutment shaft. From Fig. 3 it may be seen that the abutment shft 84 rotates back to the solid line position as soon as the subcarriage 38 leaves the idle position. This reorientation of the latching mechanism 82 does not affect the transversely shifted position of the carrier 58 but merely resets the latching mechanism 82 so that it will automatically engage in the first transversely shifted position when an unexposed cassette is forceably inserted into the carrier.

The preceding operation of the apparatus has related to the so-called "four-on-one" technique or mode of operation in which the four quadrants of a single film are individually exposed to the X-ray beam either in rapid succession or with any desired interval between successive pictures.

Figure 6E:
Figure 6F:
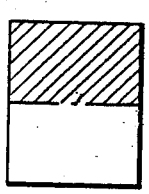
Figure 7:
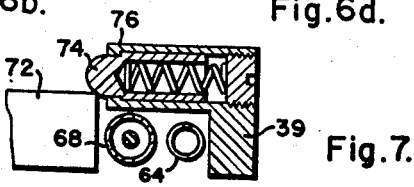
Fig. 7 is a sectional view taken substantially along the lines VII—VII of Fig. 2.

Fig. 6E illustrates an auxiliary mode of operation commonly referred to as the "two-on-one" technique. In this technique the film holder or cassette 72 is centered transversely of the spot film device in a third transversely shifted position determnied by the third shoulder 93 of the abutment shaft member 84. The front and rear halves of the film may then be successively exposed in transversely centered position to provide two transversely extending pictures on a single sheet of film. The sectional area of the X-ray beam is, of course, adjusted by means of the conventional X-ray shutters to expose only the limited rectangular area as shown in Fig. 6E. The adjustment of the latch mechanism 82 to provide transverse centering of the cassette carrier 58 by means of the third shoulder member is shown in Fig. 5. As shown in Fig. 5 the carrier centering knob 122 is pulled forward manually until spring pressed detent plunger 132 engages the notch 133 in the upper surface of the slider member 108. The slider member 108 will therefore hold its position against the pull of tension spring 109 and will remain in this position until manually returned to the normal operating condition. The aforesaid manual shifting of the slider member 108 locates it in a forwardmost position as shown in Fig. 5. The lever member 106 is pivoted through a greater angle than heretofore, and the actuator arm 102 consequently moves the square cam 96 through an angle of approximately 90°. As soon as the actuator arm 102 has moved the square cam 96 through an angle appreciably greater than 45°, the cam follower 98 will operate to further rotate the square cam 96 to a full 90° rotated position. It may be seen from Fig. 2 that this 90° rotation of the abutment shaft brings the intermediate shoulder 93 into position to engage the spring leaf stop member 94. When the abutment shaft 84 rotates as just described, the stop member 94 will be automatically disengaged from the first abutment shoulder 91, the cassette carrier 58 will automatically move transversely under the influence of the coil spring 64, and will be stopped in center position by engagement of the stop member 94 with the intermediate abutment shoulder 93. The longitudinal subcarriage 38 may then be successively shifted to the first and second longitudinally spaced active positions to expose the front and rear halves of the cassette as shown in Figs. 6E and 6F. This two-on-one technique may be repeated any number of times by inserting unexposed cassettes 72 after each pair of pictures until such time as the diagnostician chooses to return to the normal or four-on-one technique. In order to return to the four-on-one technique the operator simply pushes the one-on-one control knob 122 toward the rear of the spot film device to disengage the detent plunger 132 from the notch 133 in the slider member 108. The slider member 108 and hence the latch mechanism 82 will thereafter be under the control of the push button actuated cable 128. It should be observed that during the two-on-one technique the abutment shaft 84 remains at all times in the 90° rotated position and is held in that position by the cam follower 98. The left end of the lever member 106 remains in the depressed position as shown in Fig. 5, and the right end of cam actuator 102 remains in the depressed position so that the two will disengage when the subcarriage 38 moves from the idle position and will smoothly reengage when the subcarriage returns to the idle position.

If so desired, a third technique commonly referred to as the one-on-one technique can be utilized by providing means for positioning the subcarriage 38 in longitudinally centered position relative to the X-ray beam. The knob 122 can then be actuated to center the cassette carrier 58 both transversely and longitudinally so that a single picture of any desired dimensions may be made on a single cassette 72.

It thus becomes obvious to those skilled in the art that a spot film device has been provided with which the diagnostician can make a fluoroscopic examination and simultaneously can take a variety of X-ray pictures in a facile manner. By provision of the improved cassette shifting and positioning mechanism an apparatus requiring a minimum of effort on the part of the diagnostician is achieved. In addition, the apparatus is easier to operate, is simplified in structure and hence less subject to faulty operation and does not require the diagnostician to use his right hand for control of the carrier positioning mechanism. Freedom of the right hand is particularly advantageous in that it enables the diagnostician to continue palpation of the patient's anatomy during fluoroscopy and interstitial radiography.

While the present invention has been shown in one form only, it will be obvious to those skilled in the art that it is not so limited but is susceptible of various changes and modifications without departing from the spirit and scope thereof.

We claim as our invention:

1. In an X-ray spot film device including a frame, a subcarriage movable in a first direction between an idle position and at least one active position, a transversely shiftable cassette carrier supported on said subcarriage for movement relative thereto in a second direction between a first position and a second position, and tensioning means supported on said subcarriage for movement therewith and connected to said cassette carrier to move said carrier from said first position toward said second position, the combination of a latch mechanism for holding said cassette carrier in said first position including an elongated abutment member affixed on said subcarriage for turning movement about its longitudinal axis, a stop member mounted on said cassette carrier, said abutment member being aligned substantially parallel to said second direction and having a plurality of shoulder members spaced therealong for releasably engaging said stop member to define different transverse positions of said cassette carrier relative to said subcarriage, and manually operated position control means for turning said elongated abutment member to disengage said stop member from said shoulder members.

2. In an X-ray spot film device including a frame, a subcarriage means movable in a first direction between an idle position and an active position, a carrier for supporting a photographic plate on said subcarriage means, said carrier being movable relative to said subcarriage means in a second direction substantially perpendicular to said first direction between a first position and a second position, tensioning means carried by said subcarriage means for movement therewith and connected to said carrier to urge it toward said second position, the improvement comprising manually operated latch means releasably holding said carrier in said first position including an elongated abutment member having a plurality of shoulder members spaced therealong and a stop member for engaging said shoulders, with said abutment member being disposed with its long dimension substantially parallel to said second direction and said stop member being affixed for relative movement with respect to the length of said abutment member, and manually operated trip means for actuating said abutment member to disengage said stop member from said shoulder members, said trip means including a first operator's control means positioned on said frame adjacent said idle position so as to be convenient for manual actuation and means to operatively connect said operator's control means to said abutment member when said subcarriage means is in said idle position.

3. In an X-ray spot film device including a frame, a subcarriage movable longitudinally of said frame between an idle position and an active position, a cassette carrier mounted on said subcarriage for movement thereon transversely of said frame between first and second transverse limit positions and a transverse intermediate position, the combination therewith of a stop member carried by said cassette carrier, an elongated abutment member rotatable about an axis extending longitudinally therethrough and mounted on said subcarriage in extension transversely of said frame, said elongated abutment member having first and second longitudinally spaced-apart stop shoulders disaligned circumferentially of said axis and extending radially thereof for cooperation with said stop member to define the first transverse limit position and transverse intermediate position, respectively, of said cassette carrier, spring means biasing said cassette carrier in the direction of its second transverse limit position, and manually operated means for effecting turning movement of said elongated abutment member selected degrees to free said stop member from said first stop shoulder to permit travel of said cassette carrier to said second stop shoulder or there past, according to the degree of such turning movement selected.

4. In an X-ray spot film device including a frame, a subcarriage movable longitudinally of said frame between an idle position and an active position, a cassette carrier mounted on said subcarriage for movement thereon transversely of said frame between first and second transverse limit positions and a transverse intermediate position, the combination therewith of a stop member carried by said cassette carrier, an elongated abutment member rotatable about an axis extending longitudinally therethrough and mounted on said subcarriage in extension transversely of said frame, said elongated abutment member having first and second longitudinally spaced-apart stop shoulders disaligned circumferentially of said axis and extending radially thereof for cooperation with said stop member to define the first transverse limit position and transverse intermediate position, respectively, of said cassette carrier, spring means biasing said cassette carrier in the direction of its second transverse position, and manually operated means for effecting turning movement of said elongated abutment member selected degrees to free said stop member from said first stop shoulder to permit travel of said cassette carrier to said second stop shoulder or therepast, according to the degree of such turning movement selected, said manually operated means including a first operator's member for effecting a degree of turning movement of said elongated abutment member sufficient to free said stop member from said first stop shoulder for travel of said cassette carrier from its first to its second transverse limit position, and a second operator's member for effecting a degree of turning movement of said elongated abutment member sufficient to free said stop member from said first stop shoulder for engagement with said second stop shoulder to permit travel of said cassette carrier from said first transverse limit position to said transverse intermediate position.

5. In an X-ray spot film device including a frame, a subcarriage movable longitudinally of said frame between an idle position and an active position, a cassette carrier mounted on said subcarriage for movement thereon transversely of said frame between said first and second transverse limit positions and a transverse intermediate position, the combination therewith of a leaf spring stop member carried by said cassette carrier, an abutment shaft rotatable about its own axis and mounted on said subcarriage in extension transversely of said frame, said abutment shaft having cutaway portions forming first and second longitudinally spaced-apart radially extending stop shoulders disaligned peripherally of said shaft for cooperation with the projecting end of said leaf spring stop member to define the aforesaid first transverse limit and intermediate positions of said cassette carrier, respectively, spring means biasing said cassette carrier in the direction of its second transverse limit position, and manually operated means for effecting turning movement of said elongated abutment shaft selected degrees to free said stop member from said first stop shoulder to permit its travel with said cassette carrier to said second stop shoulder or therepast according to the degree of such turning movement selected.

References Cited in the file of this patent

UNITED STATES PATENTS

| | | |
|---|---|---|
| 2,679,599 | Stuhlman | May 25, 1954 |
| 2,709,221 | Haupt et al. | May 24, 1955 |
| 2,811,648 | Leishman et al. | Oct. 29, 1957 |
| 2,817,766 | Leishman | Dec. 24, 1957 |
| 2,834,890 | Bastin et al. | May 13, 1958 |